United States Patent [19]

Eaton et al.

[11] Patent Number: 4,511,823
[45] Date of Patent: Apr. 16, 1985

[54] REDUCTION OF HARMONICS IN GAS DISCHARGE LAMP BALLASTS

[76] Inventors: William L. Eaton, 6 Colin Grove Berea; Alan B. Murray, 304 S. Ridge Rd., both of Durban 4001 Natal Province, South Africa

[21] Appl. No.: 498,916

[22] Filed: May 27, 1983

[30] Foreign Application Priority Data

| Jun. 1, 1982 [ZA] | South Africa | 82/3819 |
| Jul. 7, 1982 [ZA] | South Africa | 82/3968 |
| Oct. 26, 1982 [ZA] | South Africa | 82/7811 |
| Nov. 26, 1982 [ZA] | South Africa | 82/8709 |

[51] Int. Cl.³ ............................................. H05B 37/02
[52] U.S. Cl. ..................................... 315/226; 315/208; 315/241 R; 315/224; 315/DIG. 7
[58] Field of Search ........... 315/208, 226, 242, 241 R, 315/DIG. 7

[56] References Cited

U.S. PATENT DOCUMENTS

| 2,971,126 | 2/1961 | Schultz | 315/205 |
| 3,084,283 | 4/1963 | Grunwaldt | 315/205 |
| 3,155,875 | 11/1964 | Wenrich et al. | 315/189 |
| 3,753,071 | 8/1973 | Engel et al. | 315/DIG. 7 |
| 3,769,545 | 10/1973 | Crane | 315/219 |
| 3,919,592 | 11/1975 | Gray | 315/DIG. 4 |
| 4,045,711 | 8/1977 | Pitel | 315/209 R |
| 4,170,747 | 10/1979 | Holmes | 315/307 |
| 4,259,614 | 3/1981 | Kohler | 315/219 |

FOREIGN PATENT DOCUMENTS

| 812504 | 4/1981 | South Africa . |
| 930082 | 7/1963 | United Kingdom . |
| 949829 | 2/1964 | United Kingdom . |
| 1246860 | 9/1971 | United Kingdom . |
| 2011730 | 7/1979 | United Kingdom . |
| 2024544 | 1/1980 | United Kingdom . |
| 2051432 | 1/1981 | United Kingdom . |
| 2071949 | 9/1981 | United Kingdom . |
| 2106339 | 4/1983 | United Kingdom . |

Primary Examiner—Harold Dixon
Attorney, Agent, or Firm—Stevens, Davis, Miller & Mosher

[57] ABSTRACT

A gas discharge lamp ballast circuit operates at high frequency and is fed from a mains supply through a rectifier having a smoothing capacitor. The invention provides for the load to include an inductor and to return to the rectifier supply at a position isolated from the smoothing capacitor by one or more diodes, and for there to be a discharge path from the smoothing capacitor through the load to charge a control capacitor, and lower the load voltage to allow a rectifier current flow to the load. The smoothing capacitor is charged by current flowing from the inductor during a relaxation phase, to a voltage higher than the peaks of the rectifier. The smoothing capacitor voltage is maintained by proportioning the control capacitor size to cause rectifier current, and not smoothing capacitor discharge, to supply circuit and load losses.

21 Claims, 18 Drawing Figures

REDUCTION OF HARMONICS IN GAS DISCHARGE LAMP BALLASTS

FIELD OF THE INVENTION

This invention relates to a method and apparatus for the reduction of harmonics in for gas discharge lamps which are fed from a rectified supply.

BACKGROUND OF THE INVENTION

Such ballasts generally have a capacitive smoothing filter located between the rectified supply and the ballast itself. This smoothing capacitor causes harmonic distortion of the current waveform during periods in which the rectified output is higher than the voltage over the smoothing capacitor, and during which time the capacitor charges up. This charging time, or conduction angle, is very small if a large capacitor is used, and all the required charge has to be loaded into the capacitor in a short period of time. This results in a heavy current output from the rectified supply during the short conduction angle, and causes current spikes in the rectified supply.

These current spikes increase the harmonic content of the power supply, and when a number of ballasts are being used, this increased harmonic distortion causes a poor power factor in the supply. This position is frowned upon by electricity supply authorities, who generally specify the minimum power factor allowable, and/or the maximum harmonic distortion allowable.

One known solution to this problem, is to use an inductive and capacitive filter between the rectified supply and the ballast input, in order to quench the current spikes This requires the use of extremely large inductors, which are expensive and bulky.

It is also known to use a storage conversion principle, whereby an inductor is controlled at a high frequency in order to allow charging of the smoothing capacitor over a wide conduction angle. This system however requires a control circuit for the storage converter, in order to regulate the discharge of current from the storage inductor.

Such a use of the storage conversion principle is described in South African Patent No. 81/2504 in the name of Siemens Aktiengesellschaft.

The circuit is relatively complex and could be expensive to produce.

It is an object of this invention to provide a method and apparatus for the reduction of harmonics in gas discharge lamp ballasts.

SUMMARY OF THE INVENTION

In accordance with this invention there is provided a gas discharge lamp ballast including capacitor smoothing means for a rectified supply input, and switching devices for switching an output alternately between the positive and negative input supply lines in alternate positive and negative cycles, there being a finite time between each of the said switchings of the output during which the switching devices are off, said ballast comprising: a load circuit having an inductive element connected to be driven in series from the said output and being adapted to have a gas discharge lamp load driven thereby;

switching control means associated with the switching devices for switching the devices considerably faster that the half cycle frequency of the rectified supply;

a return path for the rectified input between the load circuit and a supply line;

control capacitor means connected to be charged in series with the load circuit, during on times of a switching device, by discharge from the smoothing capacitor means, to cause a lowering of the voltage over the load circuit;

a uni-directional device connected in the supply line of the return path to prevent discharge along that supply line from the smoothing capacitor means into the return path;

a path for conducting charge from the inductive element in the load circuit to charge the smoothing capacitor means during said finite times; the uni-directional device also being connected, and the return path being adapted, to enable the said lowering of voltage over the load to allow a current flow, originating from the rectified input, to pass through the return path and the load circuit; and the magnitude of the control capacitor means being proportioned, for a given load, to cause sufficient of the said current flow originating from the rectified supply so as to provide, together with any other current flow through the load circuit, excluding such flow resulting from discharge of the smoothing capacitor means, at least all the circuit losses and anticipated load loss, and thereby cause the voltage over the smoothing capacitor means to remain at least as high as the peaks of the rectified supply voltage.

A further feature of the invention is provided in which the return path includes a return capacitor means and the control capacitor means is connected between the load circuit and the supply line opposite to that supply line to which the return path is taken, and the magnitude of the return capacitor means is proportioned relative to that of the control capacitor means, to enable voltage over the return capacitor means from charge stored therein from the rectified supply during the on times of one switching device, to exceed the lowered voltage occuring over the load circuit during on times of the other switching device, to thereby cause discharge from the return capacitor means through the load circuit and provide said current flow originating from the rectified supply.

A still further feature of the invention is provided in which the control capacitor means is connected between the load circuit and the supply line to which the return path is taken, to enable said sufficiency of current flow originating from the rectified supply to take place direct from the rectified supply during the period of the said lowered voltage over the load circuit. Additionally in this case, the return path can include a return capacitor means the magnitude of which is proportioned relative to the control capacitor means to permit said sufficiency of current flow originating from the rectified supply.

There is also provided for a return path for the rectified input between the load circuit and both supply lines, each through return capacitor means, being a first such means taken to the positive supply line and a second such means taken to the negative supply line, and which includes a first control capacitor means connected to one supply line, the magnitude of the return capacitor means taken to that one supply line being proportioned relative to the control capacitor means to enable a portion of said current flow to take place direct from the rectified supply, during the times of the said lowering of voltage over the load, the return capacitor means taken to the other supply line being proportioned in magnitude, relative to the control capacitor means, to enable the voltage thereover from charge stored therein during other times to exceed the voltage over the load circuit and cause discharge therefrom through the load circuit, to enable a further portion of said current flow to take place, the two portions of said current flow providing said sufficiency of said current flow.

An important feature of the invention provides for a ballast circuit in which: a return path is provided for the rectified input between the load circuit and both supply lines, each through return capacitor means, being a first such means taken to the positive supply line and a second such means taken to the negative supply line, and a first control capacitor means is connected to the positive supply line, and a second control capacitor means is connected to the negative supply line, there being a said uni-directional device connected in both supply lines;

the magnitudes of the first return and second control capacitor means being proportioned to enable, during the on time of a first switching device, said lowered voltage resulting from charging of the second capacitor means to cause a portion of said current flow direct from the rectified supply through the load circuit and the second return capacitor means, and also to enable during the on time of a first switching device, the voltage over the first return capacitor means as a result of charge stored therein from the rectified supply, during the on time of the second switching device, to exceed this lowered voltage over the load circuit and allow discharge of the first return capacitor means to cause a portion of said current flow through the uni-directional device in the positive supply line into the load circuit;

the magnitudes of the second return and first control capacitor means being proportioned to enable, during on times of the second switching device, said lowered voltage resulting from charging of the first return capacitor means to cause a portion of said current flow direct from the rectified supply through the load circuit and the first return capacitor means and also to enable the voltage over the second return capacitor means as a result of charge stored therein from the rectified supply, during the on time of the first switching device, to exceed this lowered voltage over the load circuit and allow discharge of the second return capacitor means to cause a portion of said current flow through the uni-directional device in the negative supply line into the load circuit; and, the sum of all portions of said current flow providing the said sufficiency of current flow.

In this case, there are two further connections for the control capacitor means provided, being a first such connection in which the first control capacitor means is connected in parallel with the uni-directional device in the positive supply line and the second control capacitor means is connected in parallel with the uni-directional device in the negative line. The second type of connection for the control capacitor means is one in which the first control capacitor means is connected from the positive supply line to the load circuit and the second control capacitor means is connected from the negative supply line to the load circuit.

There is also provided for an input inductor to be connected on the rectifier input side of any unidirectional devices and in series with the load, being proportioned to reduce odd harmonics in the current waveform of the supply. Furthermore, a high frequency bypass capacitor is preferably connected in parallel with the rectified output.

The proportioning of the magnitudes of the capacitor means can be arranged to cause a substantially stable voltage over the capacitor means, or alternatively, can be arranged to cause the smoothing capacitor voltage to rise progressively, in which case, clamping means must be provided to prevent the voltage rising above a predetermined maximum.

There is provided for the clamping means to include a protective switching device connected to short circuit at least one of the said uni-directional devices in a supply line on being activated, and a sensor means for activating the protective switching device on sensing a voltage above the predetermined maximum. Preferably the switching device is a thyristor connected to be gated by the said sensor means.

In cases where the voltage over the load circuit is required to drive a gas discharge lamp having a high operating voltage, in may be that the lowering of the voltage will drop this voltage below the operating voltage of the lamp, and in this case there is provided for the load circuit to include a series resonant circuit and the connections of a capacitive element thereof are adapted to receive a gas discharge lamp load to be driven in parallel with the capacitive element.

In accordance with another aspect of this invention, there is provided a method of reducing harmonics in a gas discharge lamp ballast including capacitor smoothing means for a rectified supply input, and switching devices for switching an output alternately between the positive and negative input supply lines in alternate positive and negative cycles, there being a finite time between each of the said switchings of the output during which the switching devices are off, said method comprising:

connecting a load circuit having an inductive element to be driven in series from the said output and connecting a gas discharge lamp load to be driven by the load circuit;

providing a return path for the rectified input between the load circuit and a supply line;

switching the switching devices at a frequency considerably faster than the half cycle frequency of the rectified supply;

discharging the smoothing capacitor means during on times of a switching device to charge control capacitor means in series with the load circuit to a cause a lowering of the voltage over the load circuit;

preventing discharge from the smoothing capacitor means into the return path through the supply line to which the return path is taken, by the insertion of a uni-directional device in that supply line;

utilising the lowering of voltage over the load to allow a current flow, originating from the recitified input, through the return path and the load circuit;

conducting charge from the inductive element in the load circuit to charge the smoothing capacitor means during the said finite time; and proportioning the magnitude of the control capacitor means relative to a given load, to cause, together with any other current flow through the load, excluding such flow resulting from discharge of the smoothing capacitor means, sufficient of the said current flow originating from the rectified supply, to provide at least all the circuit losses and anticipated load loss, to thereby cause the voltage over the smoothing capacitor means to remain at least as high as the peaks of the rectified supply voltage.

A feature of the method provides for including the step of providing return capacitor means in the return path from the load circuit, and proportioning the magnitude of the return capacitor means to enable voltage over the return capacitor means which results from charge during the on time of one switching device, to exceed the lowered voltage over the load circuit during on times of the other switching device, and thus allow discharge of the return capacitor means to cause said current flow through the supply line and the load circuit.

There is also provided for the method to include a step in which the lowering of the voltage over the load circuit is utilised to enable a direct flow of said current originating from the rectified supply through the return path and the load circuit during the same on times in which the said lowering of voltage occurs.

An important feature of the method provides for the inclusion of the steps providing a return path through return capacitor means for the rectified input between the load circuit and both supply lines, being a first such means taken to the positive supply line and a second such means taken to the negative supply line;

providing a first control capacitor means connected to the positive supply line and second control capacitor means connected to the negative supply line;

preventing discharge from the smoothing capacitor along both supply lines into either return path by connection of a uni-directional device in both supply lines;

proportioning the magnitudes of the first return and second control capacitor means to enable, during the on times of a first switching device, said lowered voltage resulting from charging of the second control capacitor means to cause a portion of the said current flow direct from the rectified supply through the load circuit and the second return capacitor means, and also to enable the voltage over the first return capacitor means as a result of charge stored therein from the rectified supply, during the on time of the second switching device, to exceed this lowered voltage over the load circuit and allow discharge of the first return capacitor means to cause a portion of the said current flow through the uni-directional device in the positive supply line into the load circuit;

proportioning the magnitudes of the second return and first control capacitor means to, during the on times of the second switching device, enable said lowered voltage resulting from charging of the first control capacitor means to cause a portion of said current flow direct from the rectified supply through the load circuit and the first return capacitor means, and also to enable the voltage over the second return capacitor means as a result of charge stored therein from the rectified supply, during the on time of the first switching device, to exceed this lowered voltage over the load circuit and allow discharge of the second return capacitor means to cause a portion of said current flow through the uni-directional device in the negative supply line into the load circuit; and, providing the said sufficiency of current flow from the sum of all the portions of said current flow.

Furthermore, there is also provided for the step of reducing odd harmonics in the rectified current supply waveform by proportioning and connecting an inductive element on the rectifier side of any uni-directional devices and in series with the load circuit. Preferably this step also includes allowing high frequency current to bypass the rectifier through a high frequency by-pass capacitor.

BRIEF DESCRIPTION OF DRAWINGS

Further features of the invention will become apparent from the description below of preferred embodiments of the invention, made by way of example only, and with reference to the accompanying drawings, in which.

DETAILED DESCRIPTION OF DRAWINGS

Figure 1:
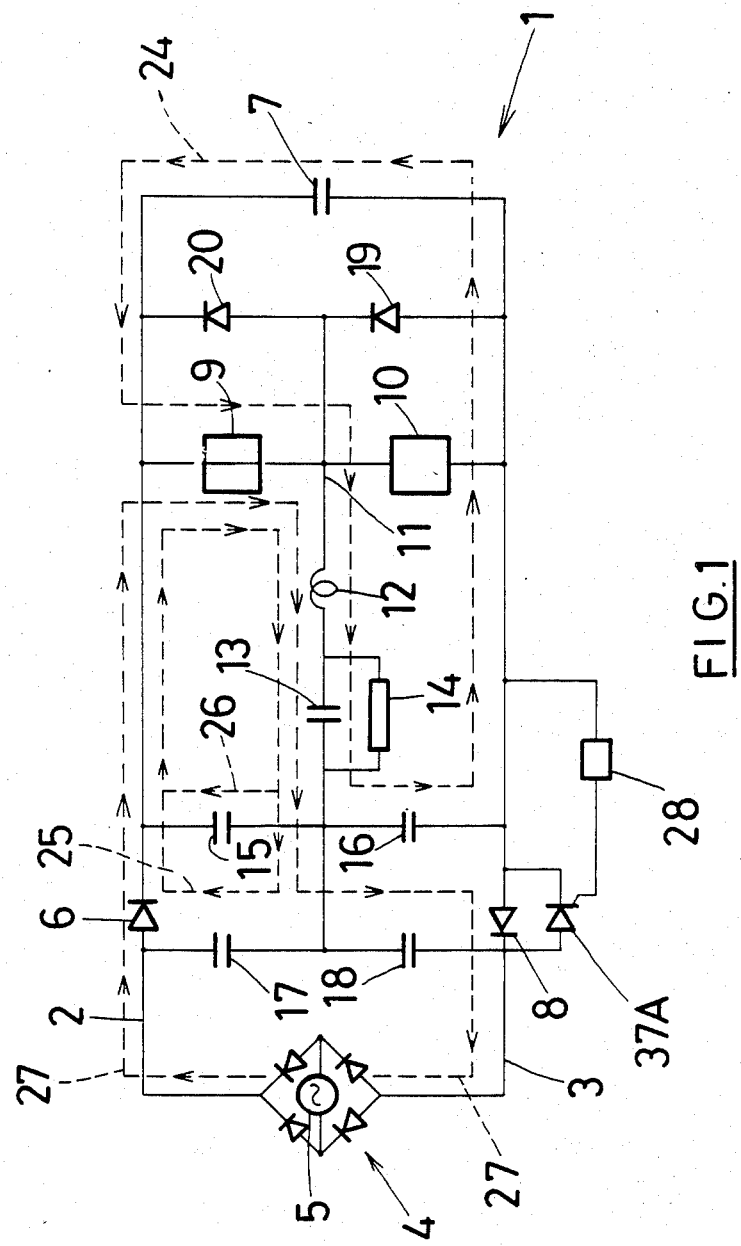
FIG. 1 is a circuit diagram of an embodiment of the invention showing current paths for a positive switching cycle.

Referring to FIG. 1, a ballast circuit indicated generally at 1 has a full wave rectified supply from positive line 2 and negative line 3 of a full wave bridge rectifier 4 having an alternating current input 5.

The positive line 2 passes from the bridge anode to cathode through a diode 6 to a smoothing capacitor 7 and the negative line 3 passes cathode to anode through a diode 8 to the other side of the smoothing capacitor 7. Two series switching devices 9 and 10 are connected across the smoothing capacitor 7, and are adapted to be switched alternately on and off with a finite interval between switching. This switching frequency is preferably around 20 kHz for a 50 or 60 Hz mains input 5. An output line 11 is connected between the smoothing devices to be switched through the device 9 to the positive line and through the device 10 to the negative line.

The output line 11 drives a series resonant circuit comprising an inductor 12 and a capacitor 13, which capacitor has a discharge tube load 14 in parallel with it. This series resonant circuit and lamp comprises the load circuit.

The series resonant circuit is connected to the positive line through control capacitor 15 and to the negative line through control capacitor 16 on the smoothing capacitor side of the diode 6 and 8, and returns to the positive line on the bridge side of the diodes 6 and 8, through return capacitor 17 to the positive line and return capacitor 18 to the negative line.

Ringing diodes 19 and 20 are connected across the switching devices 9 and 10, diode 19 being connected anode to cathode from negative to output line 11 across device 10, and the diode 20 being connected anode to cathode from the output line 11 to positive across device 9.

Figure 2:
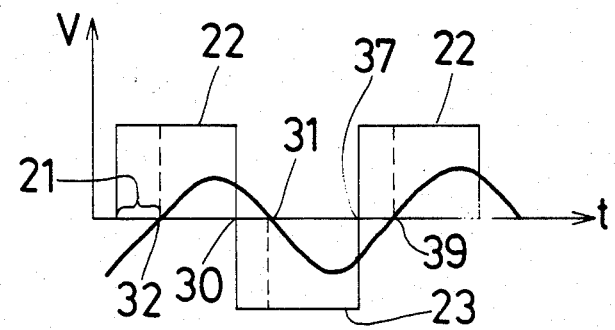
FIG. 2 is a graph of voltage and current against time over a switching device for the circuit of FIG. 1 so.

Referring now to FIG. 2, a graph of voltage and current across a switching device of the circuit, against time, is shown. Since this circuit is adapted to run inductively, the current lags the voltage by a time 21.

Initially current from the diode bridge 4 charges capacitor 7 via dioue 6 and 8 and simultaneously charges capacitors 15 16 17 and 18. Capacitor 7 is much larger than the others and charges to a voltage equal to the peak value of the supply, less the volt drops across the diode 6 and 8.

At some instance during the charging of capacitor 7, the switching devices 9 and 10 start conducting alternately at a frequency very much higher than the supply. Control circuitry (not shown) is provided for switching the devices. It will be apparent to those skilled in the art that a great variety of circuits can be used for this function. The switching of the device 9 on and off results in a positive square wave pulse 22 (FIG. 2), and the switching of the device 10 results in a negative square wave pulse 23 (FIG. 2).

Referring further to FIG. 1, with device 9 'on' four current paths can be identified: path 24 is from the positive side of capacitor 7, through switching device 9, the load and capacitor 16, to return to capacitor 7; path 25 is from the positive side of capacitor 17, through switching device 9, and the load, returning to capacitor 17; path 26 is from the positive side of capacitor 15, through the switching device 9 and load, to return to capacitor 15; and, path 27 is from the positive of the supply, through the diode 6, through the load and returns via capacitor 18.

The magnitudes of the capacitors are proportionally such that:

$C_7 >$ each of $C_{17}$ and $C_{18} >$ each of $C_{15}$ and $C_{16}$.

Using the following symbols:
Voltage over capacitor 15: $V_{C15}$
Voltage over capacitor 16: $V_{C16}$
Voltage over capacitor 7: $V_{C7}$
it will be appreciated that:

$V_{C7} = V_{C15} + V_{C16}$

It will be seen from current path 24 that capacitor 16 is charged in series with the load circuit, by discharge from the smoothing capacitor 7, and since capacitor 7 is very much larger, the voltage $V_{C7}$ is almost constant. This causes capacitor 16 to charge and the voltage $V_{C16}$ to increase, and $V_{C15}$ to decrease by the same magnitude as $V_{C16}$ increases. Thus capacitor 15 is discharged into the load circuit along path 26. If capacitors 15 and 16 are proportioned correctly, then $V_{C15}$ will decrease towards 0V and $V_{C16}$ will increase towards $V_{C7}$ during the 'on' period of switching device 9.

The rectified supply must be greater than the voltage over the load circuit plus $V_{C18}$, or $v_s V_{LC} + V_{C18}$, in order for conduction to take place.

It will be appreciated that $V_{C15}$ is also the voltage across the load circuit, so that as $V_{C16}$ increases, the load circuit voltage decreases, and the rectified supply can conduct during the period when the load circuit voltage drops below the instantaneous supply voltage.

At some instant as $V_{C15}$ decreases, $V_{C17}$ will be greater than $V_{C15}$ and the required voltage drop over diode 6. This causes a discharging current from capacitor 17 to contribute to the load via current path 25.

In this way even although $V_{C17}$ may be much lower than $V_{C15}$ during some instances of the supply period, capacitor 17 will still be enabled to discharge along path 25 into the load circuit, as result of the lowering of the load circuit voltage.

Using the following symbols:
Voltage over capacitor 17: $V_{C17}$
Voltage over capacitor 18: $V_{C18}$
Instantaneous supply voltage : $v_s$
It follows that $v_s = V_{C17} + V_{C18}$.

Capacitor 18 will therefore simultaneously be charged from the supply so that $V_{C18}$ increases by the same amount as $V_{C17}$ decreases.

A thyristor 27 is shown across the diode 8, having its gate controlled by a sensor 28, which senses voltage across the smoothing capacitor 7. Should $V_{C7}$ go too high, the thyristor will be gated to short circuit the diode 8, and thus prevent further build up of $V_{C7}$.

When the device 9 switches off, device 10 does not immediately switch on, and a finite time lapses before the device 10 switches on. This time is shown in FIG. 2 as the time between switch off of the device 9, and the transition of the lagging current wave form from the positive side to the negative side of the origin of the time axis. In the event of the switching of the devices being controlled by current feedback means, it will be appreciated that this time can be arranged to always be defined by the above parameters, since the negative going current wave form will initiate turn-on of the device 10.

Figure 3:
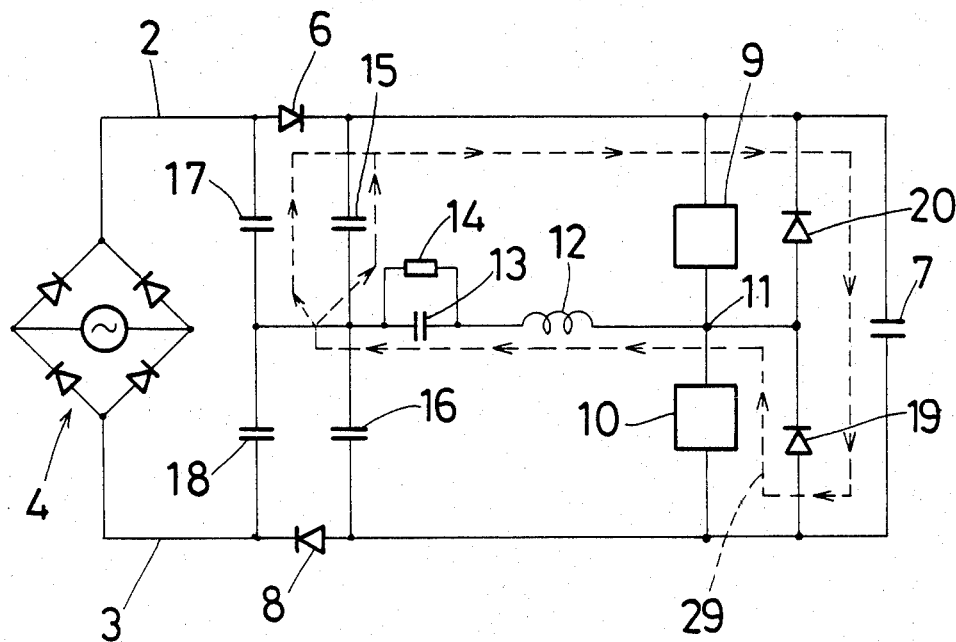
FIG. 3 is a circuit diagram showing current paths in the circuit of FIG. 1 with no switching following a positive cycle.

Referring now to FIG. 3, the circuit is the same as that described with reference to FIG. 1, and the reference numerals refer to the same circuit components; the current paths, as will be described, are different. When the switching device 9 turns 'off', and because of the phase shift 21 shown in FIG. 2, the collapsing magnetic field associated with the inductor 12 causes current path 29 from the positive side of capacitor 7, through diode 19 and the load circuit, branching into two paths through capacitors 17 and 15, and returning to capacitor 7. This off period of both devices is shown as the period of from 30 to 31 in FIG. 2 and represents a charging current into capacitor 7. The area under the sine curve in FIG. 2 represents charge, and over the period 30 to 31 represents the charge into capacitor 7, whereas the charge in the period 32 to 30, the 'on' time of device 9, is discharge from capacitor 7 and the supply. If the supply contribution during the latter period (32–30) is high enough so that the charge into capacitor 7 during the former period (30 to 31) is greater than the discharge from this capacitor (during period 32 to 30), then $V_{C7}$ will increase. It will be appreciated that the control capacitor size controls the rate with which the voltage over the load circuit drops, during an on time of switching device, and thus controls the length of time during which this supply contribution is made.

In this way circuit constants can be selected to ensure that $V_{C7}$ is always greater than the supply peak voltage, so that after the initial charge, capacitor 7 is no longer directly charged from the supply, and the supply contribution provides the circuit and load losses. A balance can be reached to enable $V_{C7}$ to remain stable, or it can be allowed to climb to a maximum where it is clamped by, for example, the thyristor and sensor 27 and 28 of FIG. 1.

Figure 4:
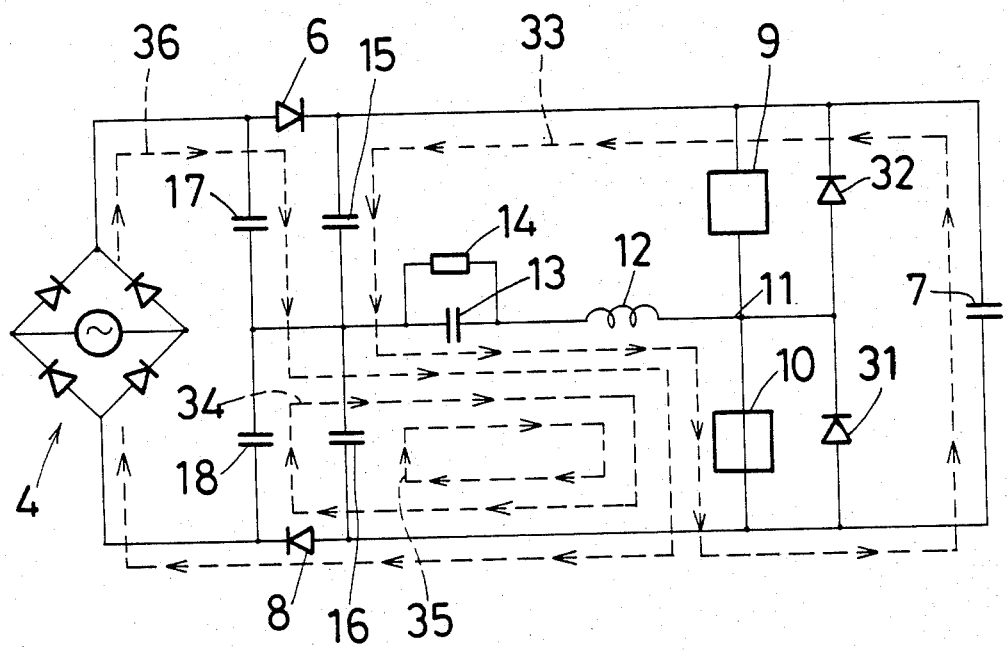
FIG. 4 is the circuit of FIG. 1 showing current paths for a negative switching cycle.

Referring to FIG. 4, this figure shows the same circuit as described with reference to FIG. 1, with the reference numerals indicating the same circuit components. In FIG. 4 however, the switching device 10 has now switched 'on', and four current paths can be identified: path 33 proceeds the positive side of capacitor 7, through capacitor 15, the load circuit, switching device 10, to return to capacitor 7; path 34 is from the positive side of capacitor 18, through the load circuit, switching device 10, to return through diode 8 to capacitor 18; path 35 proceeds from the positive side of capacitor 16 through the load circuit, switching device 10, to return to capacitor 16; and, path 36 proceeds from the positive side of the supply, through capacitor 17, the load circuit, switching device 10, to return to the supply via diode 8.

The control capacitor 15 is charged via path 33 in series with the load circuit by discharge from the smoothing capacitor 7. As the voltage over capacitor 15 ($V_{C15}$) increases, the voltage over capacitor 16 ($V_{C16}$) decreases by the same amount. At some instant $V_{C16}$ is lower than the voltage of capacitor 18 ($V_{C18}$) and at this time capacitor 18 discharges and contributes to the load current.

At any instant:

$$v_s = V_{C17} + V_{C18},$$

and therefore capacitor 17 charges by means of supply current path 36 so that $V_{C17}$ increases by the same magnitude as $V_{C18}$ decreases. Also, in a similar manner as that described with reference FIG. 1, $V_{C16}$ is now the voltage across the load circuit, and the supply current contribution along path 36 occurs as soon as the instantaneous supply voltage is higher than $V_{C17}$ and the decreasing load circuit voltage.

Figure 5:
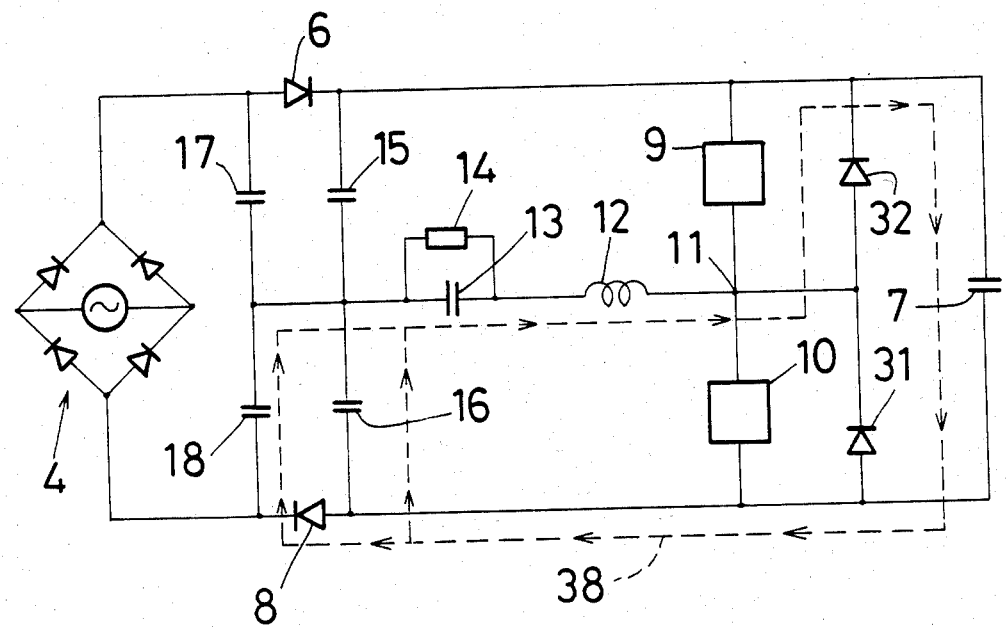
FIG. 5 is the circuit digram of FIG. 1 showing current paths with no switching following a negative cycle.

Referring now to FIG. 5, the circuit of FIG. 1 is shown in a condition where switching devices are off, immediately following the switching off of device 10. This is shown as the instant 37 in FIG. 2. In this position, the collapsing magnetic field associated with inductor 12, causes current path 38 from capacitor 7, to capacitors 18 and 16, the load circuit, diode 20, to return to capacitor 7. These paths occur during the period 37 to 39 in FIG. 2. It will be appreciated that the portions of the pulses 22 and 23 betweeen 30 and 31, and 39, shown demarcated in dotted lines, represent conduction during off times of both devices 9 and 10.

It will also be appreciated that the alternate charging and discharging of the capacitors 17 and 18 as described, assists in causing a supply current over a greater period of the supply cycles. It will also be apparent from the current paths as described and illustrated above, that while the control capacitors 15 and 16 are charged from the discharge of the smoothing capacitor 7, the charge stored in a return capacitor during one half cycle, to be discharged into the load circuit during the next half cycle, originates from the rectified supply.

Since after initial charging of capacitor 7 this capacitor is only charged from the inductor during the finite 'off' time of both switching devices, the return capacitor discharge into the load circuit, and the direct rectified supply current contribution through the load circuit, must together provide for circuit and load losses.

Figure 6:
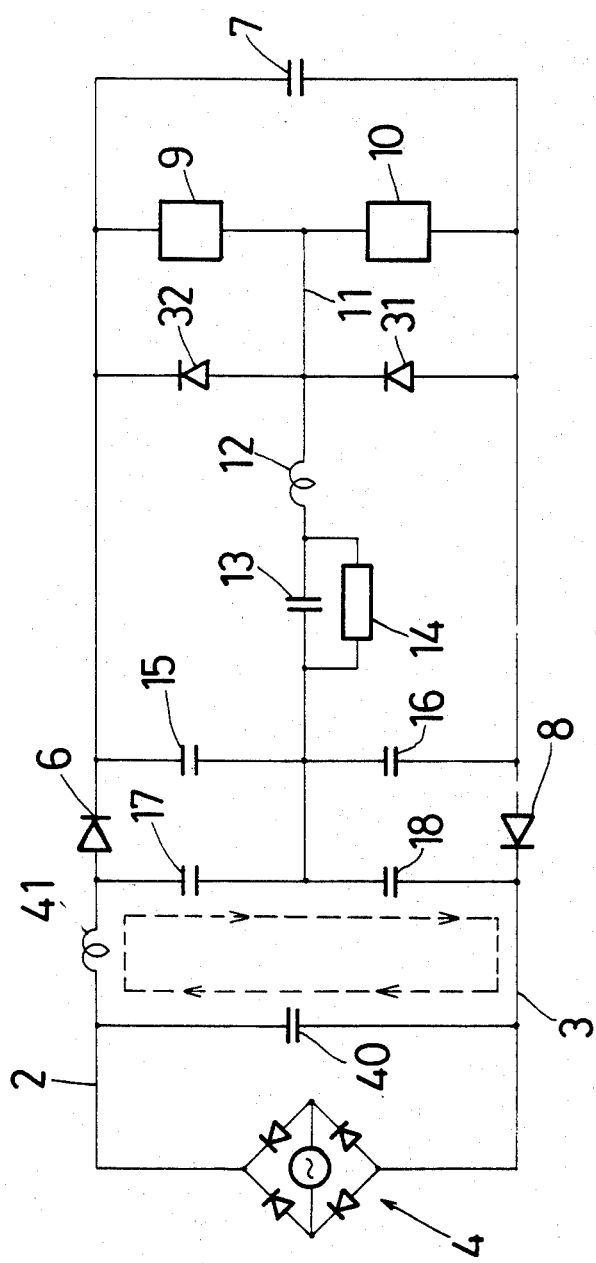
FIG. 6 is a circuit diagram of the embodiment of FIG. 1 having an inductive input filter.

Referring now to FIG. 6, there is shown the same circuit as described with reference to FIG. 1, with numerals indicating the same circuit components. In this case the bridge rectifier 4 however is removed from its supplied position across the capacitor 17 and 18, and charges a capacitor 40 in parallel across it which in turn drives through an inductor 41 to the positive rail between the anode of diode 6 and the positive side of capacitor 17. The negative rail is joined to the capacitor 18 and the negative side of the bridge.

Figure 7:
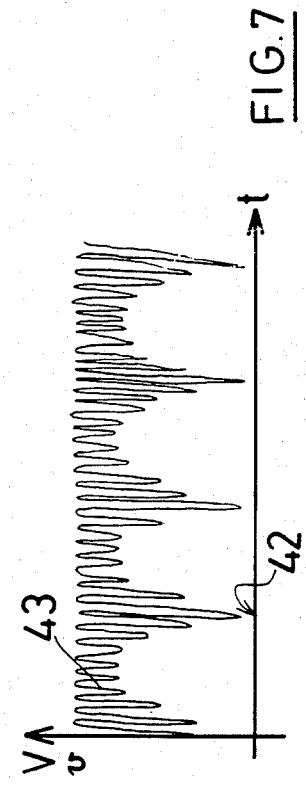
FIG. 7 is a graph of voltage over the return capacitors against time for the circuit of FIG. 6.

The voltage over the capacitors 17 and 18, from positive to negative rail, is shown against time in the graph of FIG. 7. The main frequency is indicated by numeral 42 and the modulated switching device frequency by reference numeral 43. It has been found in practice that the addition of the inductor 41 and capacitor 40 aid in further reducing harmonics. It is thought that this result is obtained by the effect of these components on the current wave form in that the approximate square wave at this position is altered to approximate a sinusoidal wave form, having of course less odd harmonics. This follows from the effect of the inductor in rendering the rate of charge current therethrough dependant on the more sinusoidal voltage form.

Figure 8:
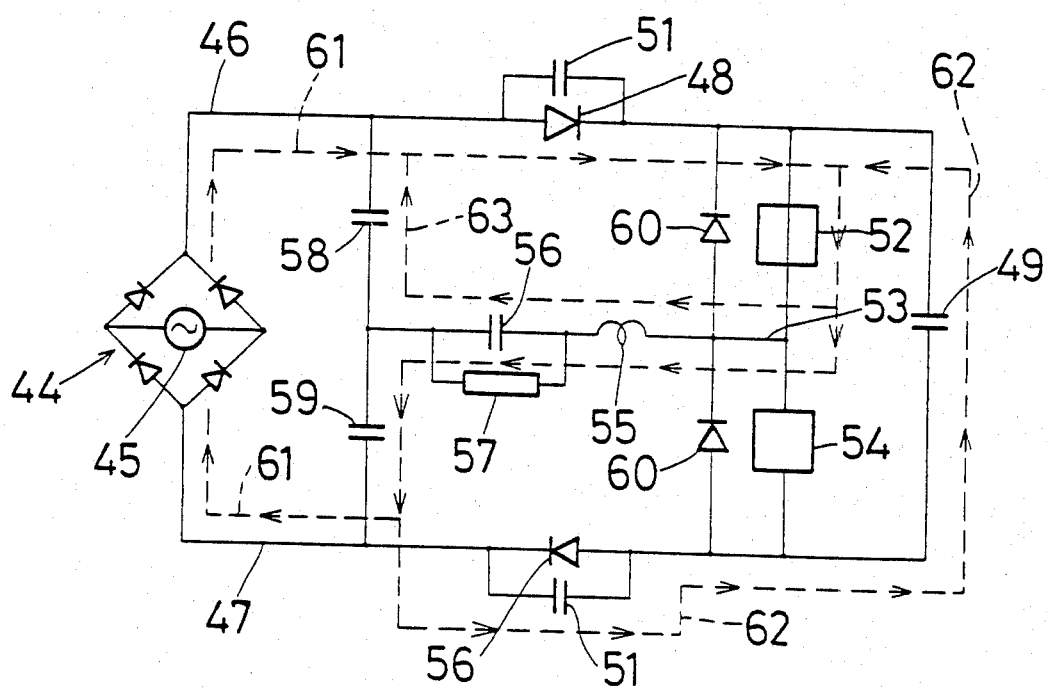
FIG. 8 is a circuit diagram of an alternative embodiment of the invention and showing current paths for a positive switching cycle.
Figure 9:
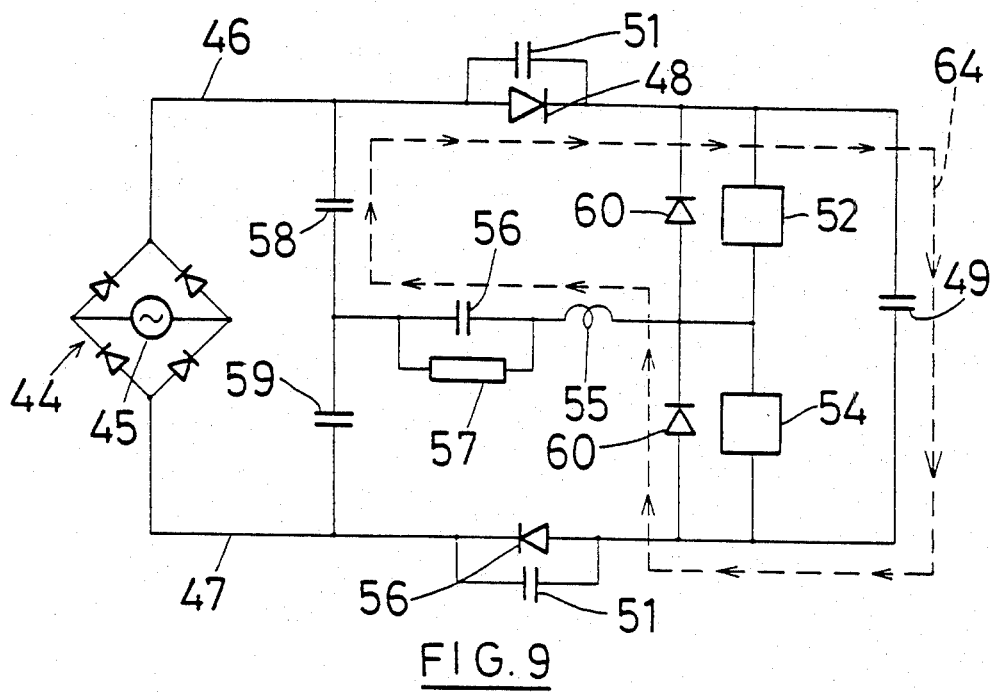
FIG. 9 is the circuit diagram of FIG. 8 showing current paths with no switching following a positive cycle.

Referring now to FIGS. 8 and 9, a different but similar embodiment is shown. A full wave rectifying bridge 44 receives an alternating supply from supply 45 and feeds out rectified current to a positive line 46 and a negative line 47.

The positive line passes anode to cathode through a diode 48 to a smoothing capacitor 49 and the negative line 47 passes through a diode 50 from cathode to anode to the other side of the smoothing capacitor 49. Control capacitors 51 are located in parallel across each of the diodes 48 and 50.

A switching device 52 is connected from the positive line 46 on the smoothing capacitor side thereof to switch the positive line through to an output along line 53, and a similar switching device 54 is connected from the output line 53 to the negative line 51 on the smoothing capacitor side of the diode 50. The devices are switched alternately by control circuitry (not shown) which waits a finite time after switching one device off before switching the other device on. The drive line 53 feeds a series resonant circuit comprising an inductor 55 and a capacitor 56, the capacitor having a gas discharge lamp load 57 in parallel therewith. The series resonant circuit returns to the positive line 46 through a return capacitor 58 on the bridge side of the diode 48, and also returns to the negative line 47 through a return capacitor 59 on the bridge side of the diode 50.

On the smoothing capacitor sides of diodes 48 and 50, ringing diode 60 is connected anode to cathode from the negative line 47 to the output line 53 across the switching device 54 and a further such diode 60 is located from the output line 53 to the positive line 46 across switching device 55. Capacitors 58 and 59 are proportioned relative to capacitors 51, so that the magnitude of each of capacitors 58 and 59 is greater than each of capacitors 51 and of course capacitor 49 is much greater than each of capacitor 58, capacitor 59 or any capacitor 51.

Capacitors 58 and 59 serve as return capacitor means, while the capacitors 51 form the control capacitor means.

In use, with the switching device 52 on and the switching device 54 off, three current paths can be identified, and are shown in FIG. 8. Current path 61 proceeds from the positive side of the bridge 44 through the diode 48, device 52, the load, and returns to the bridge through capacitor 59. Current path 62 proceeds from the positive side of capacitor 49 through the switching device 52, the load, capacitor 59, the control capacitor 51 in the negative rail, to return to the capacitor 49. The last current path 63 passes from the positive side of the capacitor 58, through the diode 48, device 52, the load, to return to the capacitor 58.

The smoothing capacitor discharge current flow along path 62 charges return capacitor 59 and negative rail control capacitor 51 in series therewith, and since each of the control capacitors are considerably smaller than each of the return capacitors, this capacitor 51 charges up to a high voltage tending towards the smoothing capacitor voltage.

This lowers the voltage over the load circuit ($V_{LC}$) and enables the rectified supply to conduct, along path 61, when its voltage exceeds the $V_{LC}$ and the voltage over capacitor 59.

This lowered voltage $V_{LC}$ over the load circuit also causes capacitor 58, charged during the previous half cycle, and the positive rail capacitor 51, to discharge along path 63.

Clearly although the embodiment differs, the operation is governed by the same principles as described for the embodiment of FIGS. 1 to 5.

The switching control circuit (not shown) which switches the devices 52 and 54 now switches the device 52 off, and waits for a finite time before switching the device 54 on. This position is shown in FIG. 9, where the same circuit as that of FIG. 8 is shown, with the same reference numerals.

Referring to FIG. 9, with both the switching devices off, the collapsing field of the inductor 55 causes a continuation of current and this current passes along path 64, being through the inductor to the return end of the series resonant circuit, through the capacitor 58 and diode 51 to charge the smoothing capacitor 49.

During a negative half-cycle, with device 54 'on', charge on the return capacitor 59 will be discharged by the same action as was the charge in the return capacitor 58.

It will be appreciated that the above described operation is closely analogous to that described with reference to FIGS. 1 to 5. Again in this embodiment, the correct proportioning of the discharge of the smoothing capacitor 49, during the 'on' time of a switching device, must be obtained in order that the charging of the capacitor 49 which occurs during the off time of both devices, is at least equal to the discharge.

It will also be appreciated that the current paths and operation of the circuit during the time in which the switching device 52 is 'on', the period thereafter during which both switching devices are 'off', will be a mirror image of the paths described with reference to FIGS. 8 and 9.

Figure 10:
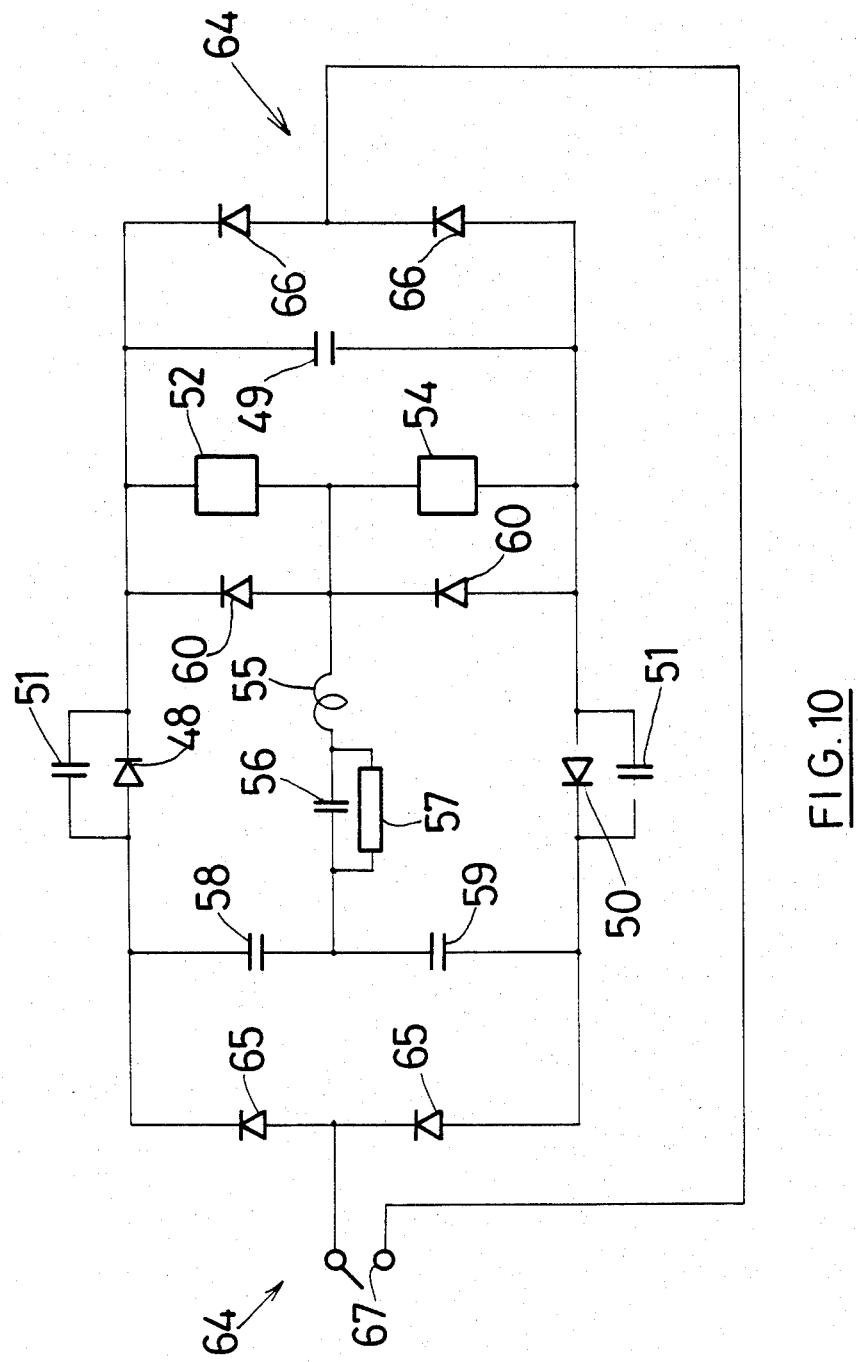
FIG. 10 is a circuit diagram of a variation of the circuit FIGS. 8 and 9.

Refering to FIG. 10, this circuit has the same components with the same reference numerals as the circuit of FIGS. 8 and 9, with the exception of the diode bridge 44 of FIGS. 8 and 9. A full wave rectifying bridge 64 is provided instead in 'split' manner, with a pair of diodes 65 thereof in parallel with capacitors 58 and 59, and the other pair of diodes 66 thereof in parallel with the smoothing capacitor 49. The alternating current input 67 is connected as normal between the junctions of each two diodes in a pair. It has been found in practice that the circuit operates to good effect, with the diode pairs 65 and 66 performing as a rectifier.

Referring now to FIGS. 11 to 14, a still further embodiment is shown. A full wave rectifing bridge 68 has a positive supply along line 69 and a negative supply along line 70, the positive line 69 passing anode to cathode through a diode 71 to one side of a smoothing capacitor 72. The negative line 70 is connected directly to the other side of the smoothing capacitor.

A switching device 73 is connected from the positive line 69 between the diode 71 and smoothing capacitor 72, to switch an output line 74 to the positive line. From the output line 74 a further switching device 75 is connected down to the negative line 70 to switch the output line to the negative supply line. The switching device 73 has a ringing diode 76 connected in parallel thereacross, anode to cathode from the output line to the positive supply. Similarly, a ringing diode 77 is connected, anode to cathode, from the negative line 70 to the output 74 across the switching device 75. The output line 74 passes through an inductor 78 and a gas discharge lamp load 79 to return to the positive supply line 69 through a return capacitor 80, on the anode side of diode 71. A control capacitor means is connected from the positive line 69, on the cathode side of diode 71, to the return end of the load circuit comprising inductor 78 and gas discharge lamp 79.

Figure 11:
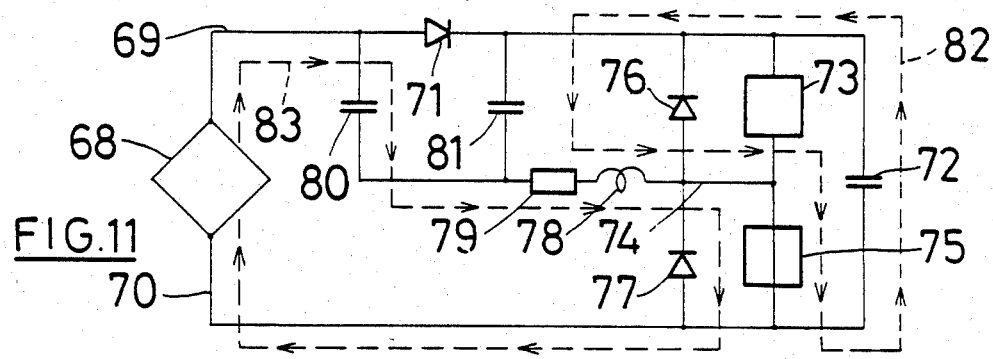
FIGS. 11–14 are circuit diagrams of a further embodiment of the invention in various stages of switching; and, FIGS. 15–18 are circuit diagrams of a still further embodiment of the invention in various states of switching.

Referring now to FIG. 11, the circuit is considered with the switching device 75 on, and two current paths can be identified: the first path is current path 82 which is a discharge from the smoothing capacitor 72 along the positive supply line through the control capacitor 81, the load circuit, the switching device 75, and back to the smoothing capacitor. A second path 83 passes from the positive side of the bridge rectifier 68 through the capacitor 80, the load circuit, switching device 75, and back to the bridge.

The charging of the control capacitor 81 in series with the load circuit, causes the load voltage to drop, since both are in effect in series across the smoothing capacitor 72. Since the control capacitor is once again considerably smaller than the smoothing capacitor as well as the return capacitor 80, the voltage across the load circuit will drop rapidly, and as soon as the voltage over the load circuit is smaller than that of the rectified supply, the current path 83 will commence and the rectified supply will then contribute directly to the load. The relative contributions of the discharge from the smoothing capacitor and the current flow from the bridge rectifier will be proportioned by the relative size of the control capacitor 81, as is described below.

Figure 12:
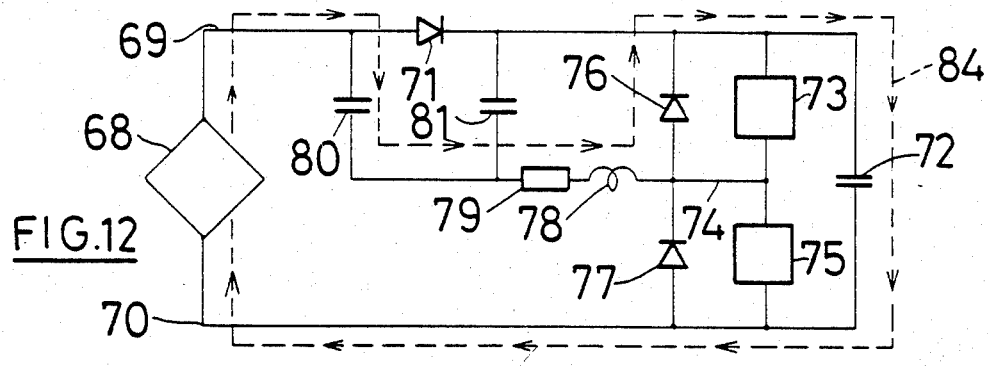

Referring to FIG. 12, the circuit is shown with both the switching devices 73 and 75 off following the switching path of FIG. 11. Once again, two current paths can be identified, being a first path 84 from the inductor, as a result of the collapsing field therearound, through the ringing diode 76 into the smoothing capacitor and back through the negative line 70, through the bridge 68, return capacitor 80 and back to the inductor 78. Thus the current path 84 serves to charge the smoothing capacitor 72.

Figure 13:
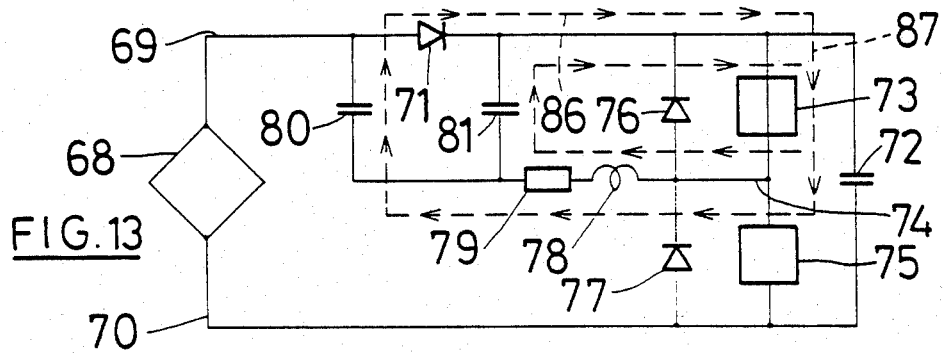

Referring to FIG. 13, a circuit is shown with the switching device 73 on, following the state of switching described with reference to FIG. 12. One current path is shown, being a current path 86 resulting from the discharge of the return capacitor 80 through the diode 71, switching device 73, the load circuit and back to the capacitor 80, and the second current path 87 is shown resulting from the discharge of the control capacitor 81 into the positive line through the switching device 73, the load circuit, and back to the control capacitor.

Figure 14:
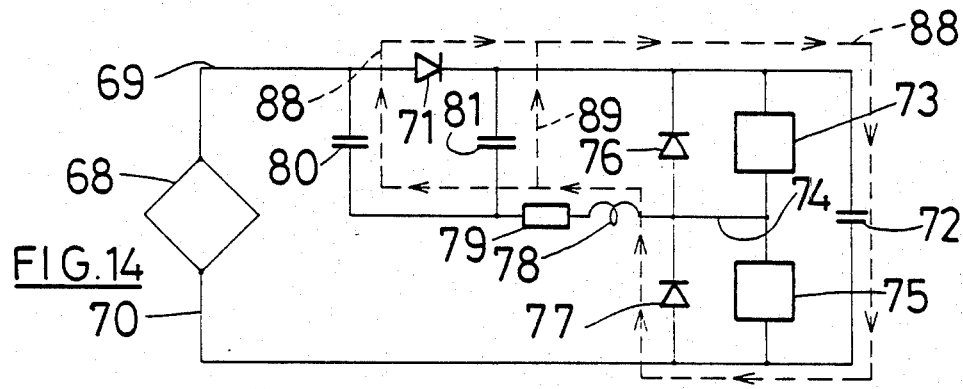

Referring now to FIG. 14, the circuit is shown with both switching devices 73 and 75 off, following the switching state as described with reference to FIG. 13. Two current paths are shown being path 88 which proceeds from the inductor 78 as a result of the collapsing field therearound, into the return capacitor 80 to the positive line, through the diode 71 and into the smoothing capacitor 72, and from the smoothing capacitor through the ringing diode 77 back to the inductor. The second current path 89 proceeds from the inductor 78 to branch through the control capacitor 81 to join the current path 88 for the remainder thereof. It will be appreciated that once again during the finite off time of both switching devices, the collapsing fields of the inductor causes charging of the smoothing capacitor 72.

In general, the charging up of the control capacitor 81 (FIG. 11) causes the lowering of the voltage over the load, and allows a direct contribution from the rectified supply. If the supply contribution of path 83 (FIG. 11) is proportioned relative to the smoothing capacitor discharge contribution 82, then it can be arranged to provide the circuit and load losses, and thereby enable sufficient supply contribution to the storage of energy in the inductor 78, for any losses from the smoothing capacitor 72 during its discharge phase, to be compensated by charging of the smoothing capacitor with supply energy in the inductor, during finite times. In this way the voltage across the capacitor 72 can be increased to a suitable maximum which is above the peak voltage of the rectified supply.

It will be appreciated that the return capacitor 80 may be replaced by a short circuit without substantially affecting the principle of the mechanism as described above with reference to FIGS. 11 to 14. Also it will be appreciated that a "negative" rail version of the embodiment of FIGS. 11 to 14 is possible, with the diode 71 located in the negative rail from anode to cathode between the smoothing capacitor and recitifier, with the capacitors 80 and 81 taken to the negative rail on either side of the diode as before. The current paths are exactly analogous to those described with reference to FIGS. 11 to 14. Furthermore, if the "negative rail" version of this embodiment is combined with that of the "positive rail" version of FIGS. 11 to 14, the embodiment of FIG. 1 will be created.

It will still further be appreciated that the return capacitor 80 of this embodiment is replaced by a short circuit, that the resulting embodiment is equivalent to a one sided version of the embodiment of FIGS. 8 and 9, with the negative rail control capacitor 51, and the return capacitor 59, both removed, and capacitor 58 replaced by a short circuit.

A yet further embodiment of the invention is described with reference to FIGS. 15 to 18. The circuit diagram of these figures is given the same reference numerals referring to the same components as are described with reference to FIGS. 11 to 14, with the exception that the control capacitor 81 of FIGS. 11 to 14 is removed, and replaced by a control capacitor 90 in FIGS. 15 to 18, which control capacitor 90 is connected from the return of the load circuit to the negative rail.

Figure 15:
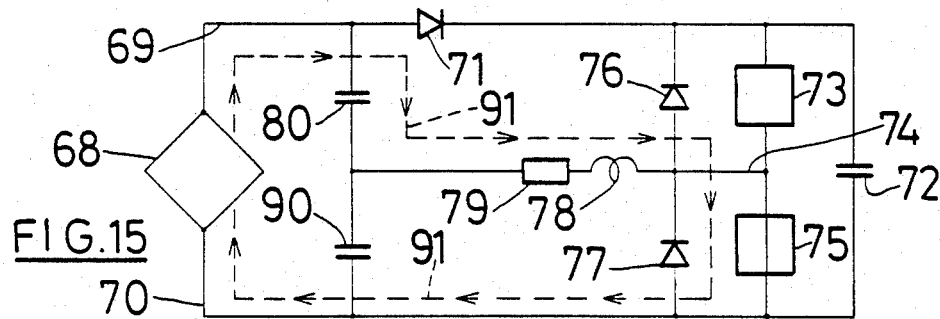

Referring now to FIG. 15, device 75 is on, and a single current path exists, being path 91 from the positive of the rectified supply through the return capacitor 80, the load circuit, device 75, to return to the rectifier. During this time the return capacitor 80 is charged up from the rectified supply.

Figure 16:
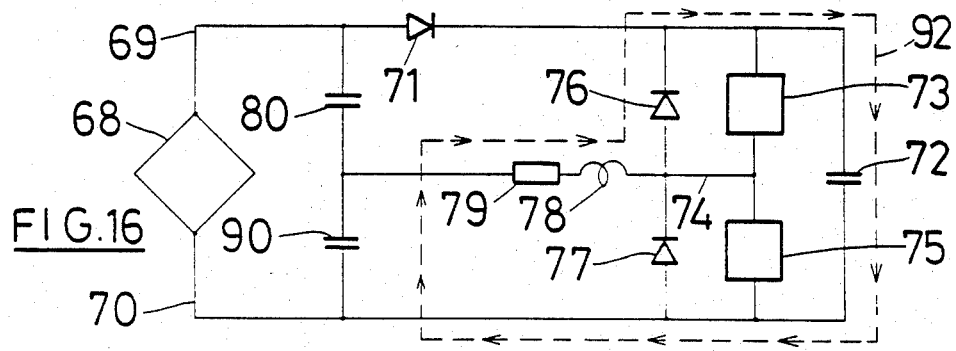

Referring to FIG. 16, both devices 73 and 75 are off following the switching state of the circuit of FIG. 15, and the collapsing field around the inductor 78 continues current flow along path 92 from the inductor 78, through ringing diode 76, to charge smoothing capacitor 72, and return along the negative rail through control capacitor 90 back to the inductor 78.

Figure 17:
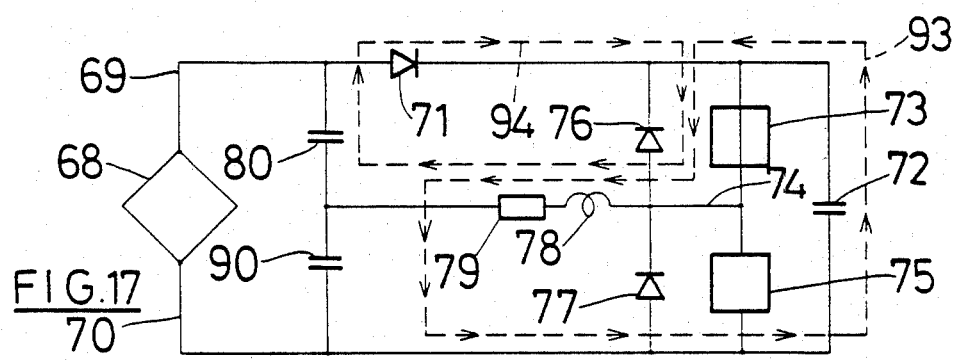

Referring to FIG. 17, switching device 73 is shown on following the switching state of FIG. 16. Two current paths are shown. The first is a discharge path 93 from the smoothing capacitor 72, through the switching device 73, through the load circuit, to charge the control capacitor 90, and therefrom along the negative rail to return to the smoothing capacitor. During this time, the charging of the control capacitor 90 in series with the load circuit causes the load circuit voltage to drop, and as soon as the load circuit voltage drops to a voltage lower than that of over the return capacitor 80, plus the required diode drop over diode 71, the return capacitor will discharge, along the second path 94, through the diode 71, the switching device 73 and the load circuit to return to itself. The magnitudes of the return capacitor 80 and control capacitor 90 are arranged so that these current paths can occur.

Figure 18:
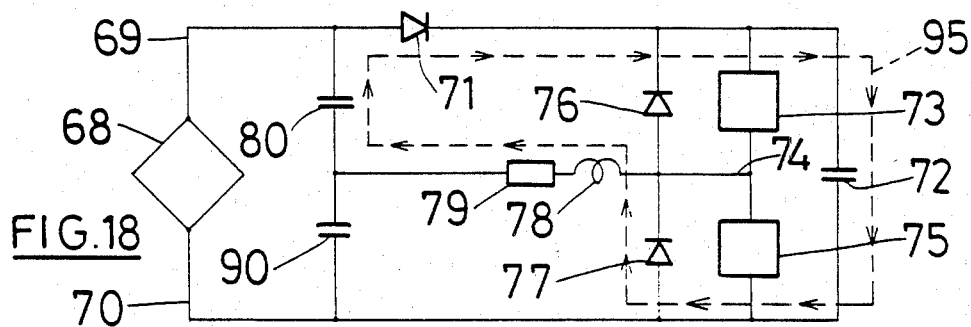

The circuits of FIG. 18 shows the devices 73 and 75 both off following the switching state of the circuit of FIG. 17. The inductor 78 continues current flow along path 95 as a result of the collapsing field therearound, and current flows from the inductor 78 through the lamp 79, the return capacitor 80, diode 71, to charge the smoothing capacitor 72, and the paths from the smoothing capacitor through the negative rail, ringing diode 77, to return to the inductor 78.

Thus during the off times of both the switching devices, the smoothing capacitor is charged from charge resulting from the collapsing field of the inductor.

In this embodiment, the indirect rectified supply contribution to the load circuit through the discharge of the return capacitor 80, combines with the direct recitifed supply current path 91 through the load, to provide the sufficiency current flow for circuit and load losses and energy stored in the inductor, to maintain the smoothing capacitor voltage at the required level.

The embodiments of FIGS. 11 to 14 and 15 to 18 are suitable for driving low voltage gas discharge lamps, but care must be taken to ensure that the lowering of voltage over the load circuit does not drop the voltage over the lamp below its minimum operating voltage. If higher lamp voltages are required, a series resonant load circuit can be provided with the lamp over a reactive element thereof.

It is considered that the invention provides a useful circuit and method for reducing harmonics in gas discharge lamp ballasts.

What we claim is:

1. A gas discharge lamp ballast including capacitor smoothing means for a rectified supply input, and switching devices for switching an output alternately between the positive and negative input supply lines in alternate positive and negative cycles, there being a finite time between each of the said switchings of the output during which the switching devices are off, said ballast comprising:

a load circuit having an inductive element connected to be driven in series from the said output and being adapted to have a gas discharge lamp load driven thereby;

switching control means associated with the switching devices for switching the devices considerably faster that the half cycle frequency of the rectified supply; a return path for the rectified input between the load circuit and a supply line;

control capacitor means connected to be charged in series with the load circuit, during on times of a switching device, by discharge from the smoothing capacitor means, to cause a lowering of the voltage over the load circuit;

a uni-directional device connected in the supply line of the return path to prevent discharge along that supply line from the smoothing capacitor means into the return path;

a path for conducting charge from the inductive element in the load circuit to charge the smoothing capacitor means during said finite times;

the uni-directional device also being connected, and the return path being adapted, to enable the said lowering of voltage over the load to allow a current flow originating from the rectified input to pass through the return path and the load circuit; and the magnitude of the control capacitor means being proportioned, for a given load, to cause, sufficient of the said current flow originating from the rectified supply so as to provide, together with any other current flow through the load circuit, excluding such flow resulting from discharge of the smoothing capacitor means at least all the circuit losses and anticipated load loss, and thereby cause the voltage over the smoothing capacitor means to remain at least as high as the peaks of the rectified supply voltage.

2. A ballast as claimed in claim 1 in which the return path includes a return capacitor means and the control capacitor means is connected between the load circuit and the supply line opposite to that supply line to which the return path is taken, and the magnitude of the return capacitor means is proportioned relative to that of the control capacitor means, to enable voltage over the return capacitor means from charge stored therein from the rectified supply during the on times of one switching device, to exceed the lowered voltage occuring over the load circuit during on times of the other switching device, to thereby cause discharge from the return capacitor means through the load circuit and provide said current flow originating from the rectified supply.

3. A ballast as claimed in claim 1 in which the control capacitor means is connected between the load circuit and the supply line to which the return path is taken, to enable said sufficiency of current flow originating from the rectified supply to take place direct from the rectified supply during the period of the said lowered voltage over the load circuit.

4. A ballast as claimed in claim 3 in which the return path includes a return capacitor means the magnitude of which is proportioned relative to the control capacitor means to permit said sufficiency of current flow originating from the rectified supply.

5. A ballast as claimed in claim 1 in which there is a return path for the rectified input between the load circuit and both supply lines, each through return capacitor means, being a first such means taken to the positive supply line and a second such means taken to the negative supply line, and which includes a first control capacitor means connected to one supply line, the magnitude of the return capacitor means taken to that one supply line being proportioned relative to the control capacitor means to enable a portion of said current flow to take place direct from the rectified supply, during the times of the said lowering of voltage over the load, the return capacitor means taken to the other supply line being proportioned in magnitude, relative to the control capacitor means, to enable the voltage thereover from charge stored therein during other times to exceed the voltage over the load circuit and cause discharge therefrom through the load circuit, to enable a further portion of said current flow to take place, the two portions of said current flow providing said sufficiency of said current flow.

6. A ballast as claimed in claim 1 in which:

a return path is provided for the rectified input between the load circuit and both supply lines, each through return capacitor means, being a first such means taken to the positive supply line and a second such means taken to the negative supply line, and a first control capacitor means is connected to the positive supply line, and a second control capacitor means is connected to the negative supply line, there being a said uni-directional device connected in both supply lines;

the magnitudes of the first return and second control capacitor means being proportioned to enable, during the on time of a first switching device, said lowered voltage resulting from charging of the second control capacitor means to cause a portion of said current flow direct from the rectified supply through the load circuit and the second return capacitor means, and also to enable during the on time of a first switching device, the voltage over the first return capacitor means as a result of charge stored therein from the rectified supply, during the on time of the second switching device, to exceed this lowered voltage over the load circuit and allow discharge of the first return capacitor means to cause a portion of said current flow through the uni-directional device in the positive supply line into the load circuit;

the magnitudes of the second return and first control capacitor means being proportioned to enable, during on times of the second switching device, said lowered voltage resulting from charging of the first return capacitor means to cause a portion of said current flow direct from the rectified supply through the load circuit and the first return capacitor means and also to enable the voltage over the second return capacitor means as a result of charge stored therein from the rectified supply, during the on time of the first switching device, to exceed this lowered voltage over the load circuit and allow discharge of the second return capacitor means to cause a portion of said current flow through the uni-directional device in the negative supply line into the load circuit;

the sum of all portions of said current flow providing the said sufficiency of current flow.

7. A ballast as claimed in claim 6 in which the first control capacitor means is connected in parallel with the uni-directional device in the positive supply line and the second control capacitor means is connected in parallel with the uni-directional device in the negative line.

8. A ballast as claimed in claim 6 in which the first control capacitor means is connected from the positive supply line to the load circuit and the second control capacitor means is connected from the negative supply line to the load circuit.

9. A ballast as claimed in any claim 1 in which an input inductor is connected on the rectifier input side of any unidirectional devices and in series with the load, being proportioned to reduce odd harmonics in the current waveform of the supply.

10. A ballast as claimed in claim 9 in which a high frequency by-pass capacitor is connected in parallel with the rectified output.

11. A ballast as claimed in claim 1 in which the said proportioning of magnitudes of capacitor means is arranged to cause a substantially stable voltage over the smoothing capacitor means.

12. A ballast as claimed in claim 1 in which said proportioning of magnitudes of capacitor means are arranged to cause the voltage over the smoothing capacitor means to rise progressively, and clamping means are provided to prevent the voltage over the smoothing capacitor means from rising above a predetermined maximum.

13. A ballast as claimed in claim 12 in which the clamping means includes a protective switching device connected to short circuit at least one of the said uni-directional devices in a supply line on being activated, and a sensor means for activating the protective switching device on sensing a voltage above the predetermined maximum.

14. A ballast as claimed in claim 13 in which the switching device is a thyristor connected to be gated by the said sensor means.

15. A ballast as claimed in any claim 1 in which the load circuit includes a series resonant circuit and the connections of a capacitive element thereof are adapted to receive a gas discharge lamp load to be driven in parallel with the capacitive element.

16. A method of reducing harmonics in a gas discharge lamp ballast including capacitor smoothing means for a rectified supply input, and switching devices for switching an output alternately between the positive and negative input supply lines in alternate positive and negative cycles, there being a finite time between each of the said switchings of the output during which the switching devices are off, said method comprising:
connecting a load circuit having an inductive element to be driven in series from the said output and connecting a gas discharge lamp load to be driven by the load circuit;
providing a return path for the rectified input between the load circuit and a supply line;
switching the switching devices at a frequency considerably faster than the half cycle frequency of the rectified supply;
discharging the smoothing capacitor means during on times of a switching device to charge control capacitor means in series with the load circuit to a cause a lowering of the voltage over the load circuit;
preventing discharge from the smoothing capacitor means into the return path through the supply line to which the return path is taken, by the insertion of a uni-directional device in that supply line;
utilising the lowering of voltage over the load to allow a current flow, originating from the recitified input, through the return path and the load circuit;
conducting charge from the inductive element in the load circuit to charge the smoothing capacitor means during the said finite time; and
proportioning the magnitude of the control capacitor means relative to a given load, to cause, together with any other current flow through the load, excluding such flow resulting from discharge of the smoothing capacitor means, sufficient of the said current flow originating from the rectified supply, to provide at least all the circuit losses and anticipated load loss, to thereby cause the voltage over the smoothing capacitor means to remain at least as high as the peaks of the rectified supply voltage.

17. A method as claimed in claim 16 including the step of providing return capacitor means in the return path from the load circuit, and proportioning the magnitude of the return capacitor means to enable voltage over the return capacitor means which results from charge during the on time of one switching device, to exceed the lowered voltage over the load circuit during on times of the other switching device, and thus allow discharge of the return capacitor means to cause said current flow through the supply line and the load circuit.

18. A method as claimed in claim 16 in which the lowering of the voltage over the load circuit is utilised to enable a direct flow of said current originating from the rectified supply through the return path and the load circuit during the same on times in which the said lowering of voltage occurs.

19. A method as claimed in claim 16 including:
providing a return path through return capacitor means for the rectified input between the load circuit and both supply lines, being a first such means taken to the positive supply line and a second such means taken to the negative supply line;
providing a first control capacitor means connected to the positive supply line and second control capacitor means connected to the negative supply line;
preventing discharge from the smoothing capacitor along both supply lines into either return path by connection of a uni-directional device in both supply lines;
proportioning the magnitudes of the first return and second control capacitor means to enable, during the on times of a first switching device, said lowered voltage resulting from charging of the second control capacitor means to cause a portion of the said current flow direct from the rectified supply through the load circuit and the second return capacitor means, and also to enable the voltage over the first return capacitor means as a result of charge stored therein from the rectified supply, during the on time of the second switching device, to exceed this lowered voltage over the load circuit and allow discharge of the first return capacitor means to cause a portion of the said current flow through the uni-directional device in the positive supply line into the load circuit;
proportioning the magnitudes of the second return and first control capacitor means to, during the on times of the second switching device, enable said lowered voltage resulting from charging of the first control capacitor means to cause a portion of said current flow direct from the rectified supply through the load circuit and the first return capacitor means, and also to enable the voltage over the second return capacitor means as a result of charge stored therein from the rectified supply, during the on time of the first switching device, to exceed this lowered voltage over the load circuit and allow discharge of the second return capacitor means to cause a portion of said current flow through the uni-directional device in the negative supply line into the load circuit; and, providing the said sufficiency of current flow from the sum of all the portions of said current flow.

20. A method as claimed in claim 16 including the step of reducing odd harmonics in the rectified current supply waveform by proportioning and connecting an inductive element on the rectifier side of any uni-directional devices and in series with the load circuit.

21. A method as claimed in claim 20 including allowing high frequency current to bypass the rectifier through a high frequency by-pass capacitor.

* * * * *

UNITED STATES PATENT AND TRADEMARK OFFICE
CERTIFICATE OF CORRECTION

PATENT NO. : 4,511,823
DATED : April 16, 1985
INVENTOR(S) : William L. Eaton, et al.

It is certified that error appears in the above—identified patent and that said Letters Patent is hereby corrected as shown below:

Cover page, item (30): Foreign Application Priority Data

"Jul. 7, 1982" (for 82/3968) should read

--June 7, 1982--.

Signed and Sealed this

Twenty-ninth Day of April 1986

[SEAL]

Attest:

DONALD J. QUIGG

Attesting Officer

Commissioner of Patents and Trademarks